United States Patent Office 3,498,755
Patented Mar. 3, 1970

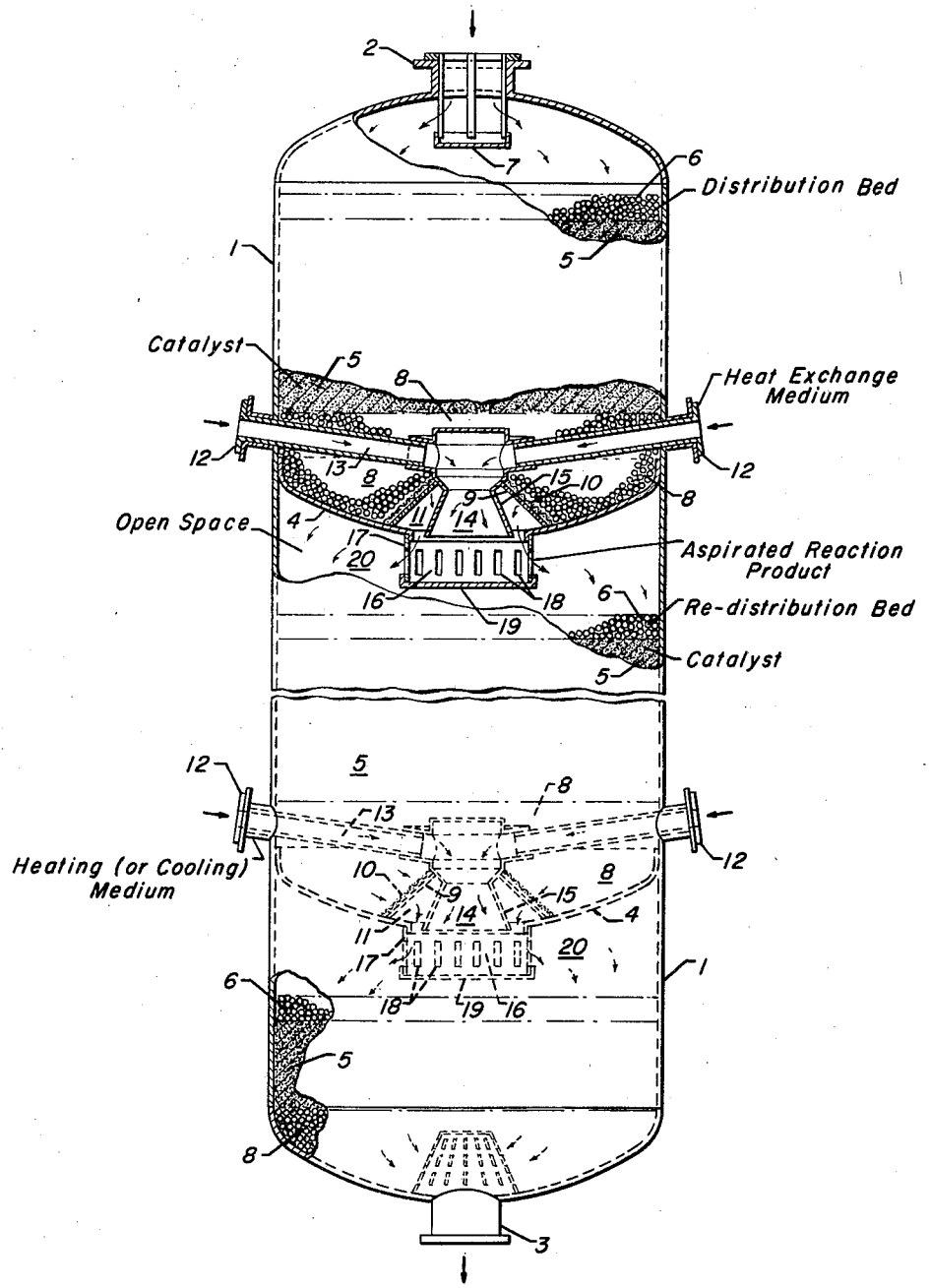

3,498,755
MEANS FOR EFFECTING A MULTIPLE STAGE
CONTACT OF A REACTANT STREAM
Henry C. Borre, Des Plaines, Ill., assignor to Universal
Oil Products Company, Des Plaines, Ill., a corporation
of Delaware
Filed May 26, 1966, Ser. No. 553,169
Int. Cl. F28d *15/00;* B01f *9/04*
U.S. Cl. 23—288                                    9 Claims

ABSTRACT OF THE DISCLOSURE

A multiple stage reactor to which a heat exchange fluid is injected between stages through a venturi nozzle discharging in an axial direction whereby there is provided temperature control by direct mixing, as well as eduction and recompression, of the main reactant stream. The design reduces pressure drop across the reactor.

---

The present invention is directed to improve means for effecting the multiple stage contact of a reactant stream and more particularly to a system which utilizes an intermediately introduced heat exchange stream to provide both a mixing and eduction effect with the reactant stream flow between contact stages.

There have been various types of multiple stage reactors used in the petroleum and chemical processing fields. Also, there have been various designs and arrangements for effecting the introduction of a heating or cooling medium into a reactor chamber at successive contact stages; however, the conventional constructions have not made use of a design where the heat exchange medium is utilized to effect an eduction of the principal reactant stream flow and thus result in a lessening of pressure drop for stream flow through the reactant unit. For example, in carrying out an endothermic conversion such as the dehydrogenation of ethylbenzene, there are two processing problems which have been encountered. One problem of course resides in the need to replace heat for the endothermic reaction taking place in the conversion zones, while the other problem resides in the need to have a minimization of pressure drop, particularly where the operation is being carried out at low pressures of the order of less than 10 to 15 p.s.i.g. On the other hand, hydrocracking and hydrogenation operations which are exothermic are optimally carried out with the use of intermediate additions of a cooler hydrogen stream, or with a suitable quench stream, between stages in order to maintain a control of temperature throughout the overall reaction zone. Again, an improved operation can result where there is special provision for introducing the cooling stream in a manner to reduce pressure drop for the reactant stream flow.

Thus, it may be considered a principal object of the present invention to provide for the multiple stage contacting of a reactant stream, with such stream being channled through a restricted area passageway zone between each stage, and a heat exchange media injected between stages in a manner to mix with and effect eduction of the main reactant stream flow, whereby to reduce pressure drop in the system.

In a broad aspect, the present invention embodies effecting the multiple stage contact and conversion of a reactant feed stream through he use of a pluraliy of separate fixed beds of contact material along with heat exchange being effected between the contact beds in an improved manner which comprises, passing said reactant feed stream successively through each of the beds of contact material, channeling the partially contacted reactant stream between each bed of the contact material to a central restricted area transfer zone provided between adjacent beds of contact material, introducing a heat exchange medium into each of the restricted area zones in a manner effecting both a downstream flow thereof and an eduction mixing with the reactant stream, whereby there is a resulting rapid direct heat exchange contact with the latter between contact beds and an enhancement of reactant stream flow from the adjacent upstream bed of contact material in each case, redistributing the combined reactant and heat exchange medium streams to the inlet end of the next successive fixed bed of contact material for further conversion therein, and subsequently withdrawing a resulting contact reactant stream at the downstream end of the last of the plurality of fixed beds of contact material.

In operating an endothermic reactor zone, such as with the ethylbenzene dehydrogenation, there can be the introduction of high temperature superheated steam into the central portion of the process unit at the different transfer zones between contact stages such that there is a resulting downstream directional flow which can educt and "repressure" the partially cooled reactant stream from an adjacent upstream contact zone. The eduction-mixing then provides a reheated reactant stream flow into the inlet portion of a next adjacent downstream contact section.

As another embodiment, the present invention may be considered to provide an improved multiple stage reactor unit providing for interstage heat exchange along with a lessening in pressure drop for fluid flow therethrough while effecting a conversion in the presence of a contact material, with such reactor unit comprising in combination, an elongated pressure tight chamber with fluid inlet means at one end thereof and fluid outlets means at the opposing end thereof, spaced apart transverse partitioning means within said chamber forming a plurality of contact sections in series alignment and subdivided contact material maintained in each of said plurality of sections, a restricted area fluid passageway within each of said partitioning means for fluid transfer between stages, heat exchange fluid inlet means to the interior of said chamber upstream of each partitioning means and at each fluid passageway, nozzle discharge means from each of said heat exchange fluid inlet means, with such discharge means being directed in a downstream direction in said chamber and through each of said fluid passageways therein whereby fluid flow through the successive contact sections is enhanced and pressure drop reduced.

Preferably, the heat exchange media introduced between stages is effected through an eductor type nozzle arrangement which is centrally located in the chamber and is encompassed by an annular shaped fluid passageway whereby the downstream flow of the reactant fluid is enhanced to effect a minimization of pressure drop for the entire multiple stage unit. The heat exchange fluid, either a heating or cooling medium, may be introduced through a single inlet conduit or through a plurality of inlet pipes which in turn converge or oppose one another such that there is a resulting single discharge stream through a venturi type nozzle or eductor means in a downstream direction within each of the fluid passageway zones of the multiple section reactor unit. A preferred arangement also makes use of a mixed fluid redistributing zones immediately downstream from the venturi-eductor means which in turn provides for an outward radial flow of the resulting reactant stream into the inlet end portion of a next adjacent downstream contact section. Layers of ceramic balls or other fluid distributing arrangements may also be utilized above and below the beds of contact material in each section of the multiple stage unit. However, it should be pointed out that it is not intended to limit the present improved reactor operation and design to being used with any one type of catalytic material or for use with any one specific conversion operation.

Reference to the accompanying drawing will serve to diagrammatically illustrate one embodiment of the improved method of operation and to one reactor construction, while the description in connection therewith will, in addition, point out further advantageous features relative to the design and operation of the multiple stage reactor.

Referring now specifically to the drawing there is indicated a vertically elongated chamber 1 having a fluid inlet nozzle 2 at the upper end portion thereof and a reaction product outlet 3 at the lower end portion thereof. A plurality of spaced transverse partitions 4 are provided across the interior portion of chamber 1 so as to provide, in effect, a plurality of separate successive contact zones 5. The latter are indicated as being at least partially filled with a catalyst or other suitable contact material to assist in carrying out a particular conversion or treating operation.

In the present drawing, the catalyst material within zones 5 is, in each instance, superimposed with distribution beds 6 of ceramic balls or other like uniformally sized material whereby to assist in effecting uniform fluid flow through a fixed bed or contact material. Thus, a reactant stream entering the upper portion of chamber 1 by way of inlet nozzle 2 is partially distributed by a deflector plate means 7 to in turn pass over the upper bed 6 and then flow through a first contact section 5. The present embodiment also indicates the use of particle supporting ceramic balls in a lower fluid collection section 8 below each of the contact beds 5. Such beds tend to uniformly redistribute the reactant stream flow and to preclude channeling through an elongated reactor tower. Suitable supporting grids 9 and screen means 10 are provided in each instance above a central passageway opening 11 within each partitioning section 4 such that the ceramic balls 8 and contact material will be precluded from falling through the open passageway zones between stages.

In accordance with the present invention, heat exchange fluid is provided at the interior of the contact chamber 1 by way of suitable inlet nozzle means 12 and conduits 13 which in turn discharge into a central downwardly directed discharge nozzle means 14. In this instance, the nozzle 14 is indicated as having a venturi shape with a restricted central portion and a flaring downstream wall portion 15. The latter, in each transfer zone, is spaced inwardly from the edge of the opening 11 in partition 4 so as to form an annular passageway for reactant stream flow leading into a mixing zone 16. It will be seen that a high velocity flow of the fluid medium through opposing or converging lines 13 will in turn provide a convergence of streams within the inlet portion of nozzle 14 so that there is a resulting downstream ejection therefrom to have an eductor effect for the reactant fluid being collected in the lower portion 8 of each contact stage to pass through screen means 10 and into a mixing-distributor section 16 for each of the stages.

The section 16 of the present embodiment, is actually formed by a cylindrical wall portion 17 having slots 18 and a substantially non-perforate lower plate 19. Thus, a resulting mixed stream is ejected laterally from zone 16 into an open space 20 which serves as an inlet zone to the next successive contact section. From the venturi action, there is, in effect, an eduction and a recompression of the effluent fluid from the preceding contact zone as it passes into the next successive contact section.

By way of explanation, in connection with a high temperature endothermic reaction, such as with the dehydrogenation of ethylbenzene to produce styrene, there may be utilized superheated steam as a heating medium for the conversion. This superheated steam is introduced by way of nozzle 12 and venturi distributor 14 at a temperature of the order of 1420° F. and in a downstream direction through the unit so as to enhance the flow of the hydrocarbon vapors collecting in the upstream collection section 8. At the same time there is effected a reheating of the vapors to a desired temperature which may be of the order of 1120° F. as they leave the mixing section 16 to enter the next successive contact stage. At successive downstream stages, the superheated steam may be at a still higher temperature so as to gradually increase the temperature of the reactant stream as it progresses from stage to stage through the entire multiple stage reactor unit. Generally, this dehydrogenation reaction will be carried out at a low pressure of the order of about 10 p.s.i.g. or preferably slightly lower. Thus, it may be seen that pressure drop through successive beds of contact material will be a problem unless means is taken to effect an eduction, such as provided by the present system, or otherwise lessening the pressure drop of the principal reactant stream flow.

As hereinbefore noted, it is not intended to limit the present improved type of operation or improved apparatus arrangement to any one system inasmuch as there are various types of conversions or treating steps which may be carried out in accordance with the present improved manner. In the case of exothermic operations, such as hydrogenation, a relatively cool hydrogen steam may be introduced through each of the inlet nozzles 12 so that a relatively cool educting stream is provided to provide the dual function of mixing with the reactant stream flow in the successive mixing sections 16, as well as assist in educting reactant stream flow from one stage to the next and thus effect a decrease in the overall pressure drop through the multiple stage unit.

Various modifications may of course be made with respect to the structural features shown in the present embodiment without departing from the scope of the present invention. For instance, a single heat exchange fluid inlet terminating in a suitable venturi-like discharge nozzle may be arranged in combination with each fluid passageway means at each stage to effect the desired eduction effect. Where multiple heat exchange fluid inlets, such as 12, are utilized at each intermediate zone between stages, then preferably they are arranged in symmetrical patterns so that there are converging or opposing flows which will result in a downstream directional flow that will in turn effect an aspirated type of flow for the reaction product stream. Various types of grids of distributor plates may of course be utilized in lieu of the layers of ceramic balls above and below the catalyst or contact material 5, so as to preclude channelling of vapor or liquid flows through the successive stages thereof. Still further, various types of screens or support means may be utilized below the lower layers of ceramic balls 8 in each of the contact sections whereby there is a resulting uniform support of material in each stage and preclusion of contact material within a fluid passageway area between zones.

Generally, the eductor nozzle arrangement accommodating the heat exchange medium will have a central arrangement with respect to a single fluid passageway or transfer zone of restricted area so as to maintain uniformity of flow through the entire multiple stage unit. On the other hand, in a large diameter chamber, where it is of advantage to use more than one fluid passageway section when transferring fluids from one section to another, then multiple aspirating means for the heat exchange medium shall be used, with at least one fluid discharge nozzle or ejector means being utilized in connection with each fluid passageway between contact sections whereby there is an overall enhancement of fluid flow through the unit and a lessening of pressure drop for the overall system.

I claim as my invention:

1. A multiple stage reactor unit providing for interstage heat exchange and a reduction in pressure drop for fluid flow therethrough in effecting a conversion in the presence of a catalytic contact material, which comprises in combination:

(1) an elongated pressure-tight chamber with fluid inlet means at one end thereof and fluid outlet means at the opposing end thereof;
(2) spaced apart transverse partitioning means within said chamber forming a plurality of contact sections in series alignment and subdivided catalytic contact material maintained in each of said plurality of sections;
(3) an opening within each of said partitioning means for fluid transfer between stages;
(4) heat exchange fluid inlet conduit means to the interior of said chamber upstream of each partitioning means terminating in an axially discharging downstream directed nozzle discharge means positioned within and spaced from the edge of each opening to form an annular restricted area fluid passageway encompassing said nozzle means whereby there is an eduction of fluid from the adjacent upstream contact section and a mixing of educted fluid and heat exchange fluid in a mixing section as defined below; and
(5) a partially enclosed mixing section encompassing the downstream open end portions of each fluid passageway and the heat exchange fluid nozzle discharge means, each of such mixing sections having a substantially non-perforate downstream wall portion and a perforate peripheral wall portion whereby the resulting mixed stream flow is radially outward and downward therefrom into the inlet end of a next successive contact section.

2. The reactor unit of claim 1 further characterized in that said openings and their respective nozzle discharge means are positioned axially in said chamber.

3. The reactor unit of claim 1 further characterized in that each of said nozzle discharge means for said heat exchange fluid is of a venturi type.

4. The reactor unit of claim 1 further characterized in that each of said heat exchange fluid inlet conduit means comprises a plurality of opposing inlet pipes.

5. The reactor unit of claim 6 further characterized in that at each fluid passageway a partially enclosed mixing section encompasses the downstream open end portions of such passageway and the heat exchange fluid nozzle discharge means, each of such mixing sections having a substantially non-perforate downstream wall portion and a perforate peripheral wall portion whereby the resulting mixed stream flow is radially outward therefrom into the inlet end of a next successive contact section.

6. A multiple stage reactor unit providing for interstage heat exchange and a reduction in pressure drop for fluid flow therethrough in effecting a conversion in the presence of a catalytic contact material, which comprises in combination:

(1) an elongated pressure-tight chamber with fluid inlet means at one end thereof and fluid outlet means at the opposing end thereof;
(2) spaced apart transverse partitioning means within said chamber forming a plurality of contact sections in series alignment and subdivided catalytic contact material maintained in each of said plurality of sections;
(3) an opening within each of said partitioning means for fluid transfer between stages;
(4) heat exchange fluid inlet conduit means to the interior of said chamber upstream of each partitioning means terminating in an axially discharging downstream directed nozzle discharge means positioned within and spaced from the edge of each opening to form an annular restricted area fluid passageway encompassing said nozzle means whereby there is an eduction of fluid from the adjacent upstream contact section and a mixing of educted fluid and heat exchange fluid immediately downstream of said restricted area fluid passageway; and
(5) a perforate support means supported from each of said transverse partitioning means and encompassing and extending upstream from the restricted area fluid passageway therein, said subdivided catalytic contact material in each section being supported upon a layer of inert solid spherical form support elements which in turn overlies said perforate support means, whereby the support elements and contact material are maintained in a fixed position.

7. The reactor unit of claim 6 further characterized in that said openings and their respective nozzle discharge means are positioned axially in said chamber.

8. The reactor unit of claim 6 further characterized in that each of said nozzle discharge means for said heat exchange fluid is of a venturi type.

9. The reactor unit of claim 6 further characterized in that each of said heat exchange inlet conduit means comprises a plurality of opposing inlet pipes.

References Cited

UNITED STATES PATENTS

| | | |
|---|---|---|
| 2,452,569 | 11/1948 | Houdry. |
| 2,461,331 | 2/1949 | Leesemann _____ 23—288 X |
| 2,535,944 | 12/1950 | Mathy _____ 23—288 |
| 2,892,262 | 6/1959 | Shirk _____ 23—288 X |
| 3,214,247 | 10/1965 | Broughton _____ 23—288 |
| 3,353,924 | 11/1967 | Riopelle _____ 23—288 |
| 3,378,349 | 4/1968 | Shirk _____ 23—288 |
| 3,227,527 | 1/1966 | Heinze et al. _____ 23—288 |
| 3,433,600 | 3/1969 | Christensen et al. _____ 23—288 |

JOSEPH SCOVRONEK, Primary Examiner